UNITED STATES PATENT OFFICE.

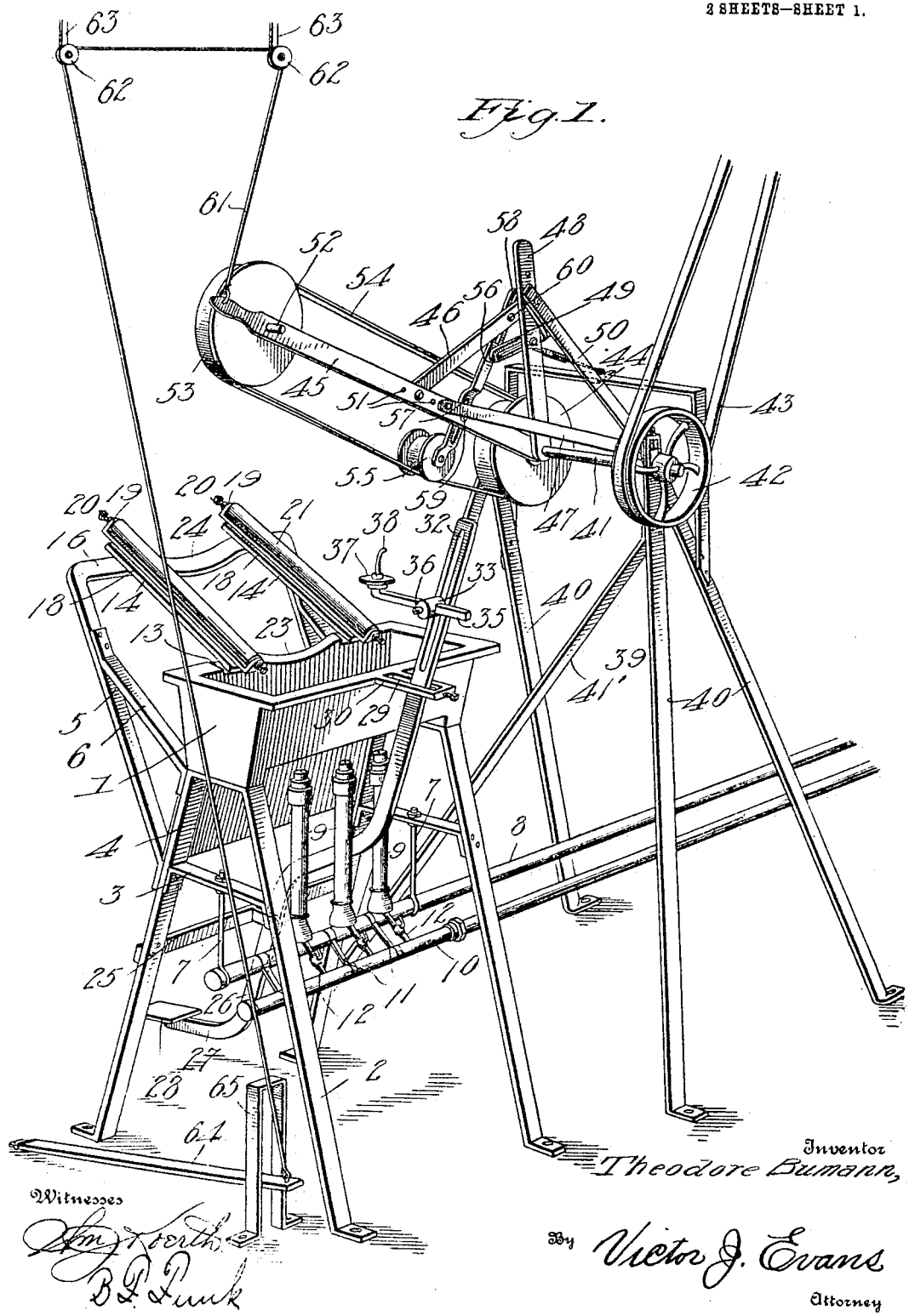

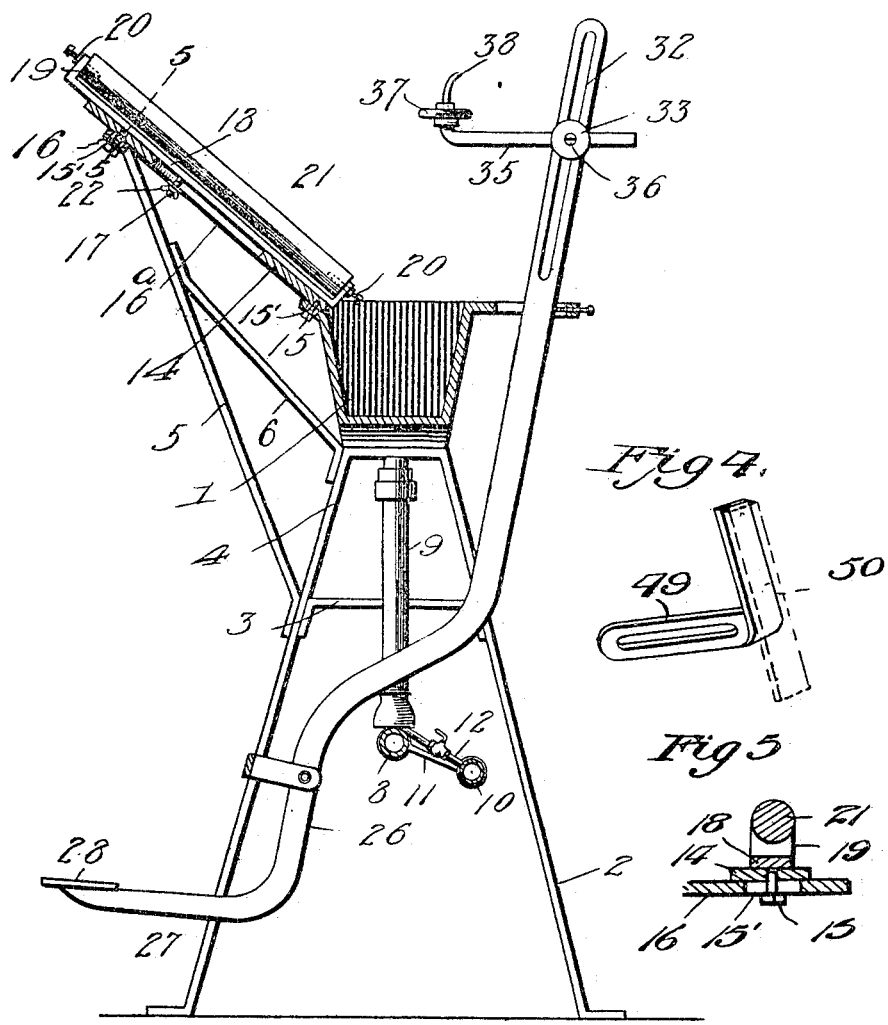

THEODORE BUMANN, OF LITCHFIELD, ILLINOIS.

SOLDERING-MACHINE.

No. 798,871.　　　　　Specification of Letters Patent.　　　　　Patented Sept. 5, 1905.

Application filed September 10, 1902. Serial No. 122,830.

*To all whom it may concern:*

Be it known that I, THEODORE BUMANN, a citizen of the United States, residing at Litchfield, in the county of Montgomery and State of Illinois, have invented new and useful Improvements in Soldering-Machines, of which the following is a specification.

This invention relates to a machine for soldering the tops and bottoms of oil-cans, straight and tapering pails, and all kinds of round vessels made of either tin or galvanized iron.

The improved machine includes adjustable features to adapt it for use on different sizes of vessels; and the primary object of the same is to provide a simple and effective combination of coöperating elements for holding a device to be soldered and moving or revolving the latter during the soldering operation by a belt while said device is held in melted solder a suitable depth to secure top, bottom, or end seams and also to easily remove surplus solder and generally expedite the operation of soldering vessels of different sizes and shapes through the medium of readily-controlled mechanism of a strong and durable nature.

The invention consists in the construction and arrangement of the several parts, which will be more fully hereinafter described and claimed.

In the drawings, Figure 1 is a perspective view of a machine embodying the features of the invention. Fig. 2 is a transverse vertical section through the soldering pot or tank and the supporting-frame for one of the holding-rollers, the mechanism for revolving the vessel or device soldered located at one end of the pot or tank being removed. Fig. 3 is a detail view, partially in top plan and in section, of a part of the machine. Fig. 4 is a detail view of the twisted strap. Fig. 5 is a detail view on the line 5 5 of Fig. 2, showing a convenient means of adjusting the upper ends of the rollers toward and from each other, a similar arrangement being preferably employed for adjusting the lower ends of the rollers.

Similar numerals of reference are employed to indicate corresponding parts in the several views.

The numeral 1 designates a soldering pot or tank supported by suitable legs 2, bolted to a floor or other base-rest and having upper cross-braces 3. A shield-plate 4 is secured to a part of the legs and depends from one side of the tank, and on the same side of the pot or tank from which said shield depends is an outwardly-projecting inclined fixed frame 5, which is rendered rigid by inclined braces 6, attached thereto and to the upper portions of the adjacent legs. Depending from the braces 3 are hangers 7, having lower looped ends which embrace a gas-pipe 8, and from the latter a plurality of burners 9 extend upwardly under the bottom of the pot or tank 1, the said burners being of the Bunsen type. An air-pipe 10 is held in close relation to the gas-pipe 8 by connecting-straps 11, and running from said air-pipe to the bases of the burners 9 are valved feed-pipes 12, whereby a suitable proportion or quantity of air may be supplied to the burners. The air-pipe 10 is connected to a suitable plug, (not shown,) and the gas-pipe 8 will also run from a gas-supply located at a distance from the machine, and it will be understood that the flow of gas through the pipe 8 will also be readily controlled by means of a valve located therein at a suitable point. Through the medium of the burners 9 solid solder disposed in the pot or tank 1 can be reduced to a liquid state and maintained in such condition as to be practically serviceable in carrying on the soldering operation. The shield-plate 4 protects the flame of the burners 9 and also relieves the operator who stands close to the frame 5 from inconvenience or discomfort from the heat of the said burners.

The upper edge of the pot or tank 1, adjacent to the frame 5, is formed with depressions 13, and therein the lower ends of upwardly-inclined supporting-frames 14 are adjustably secured and held by set-screws 15, which are adjustable longitudinally in suitable slots 15', the upper ends of the said frames resting on the upper cross-bar 16 of the frame 5. The cross-bar 16 is also formed with slots 15' to receive set-screws 15 for securing the adjustment of the upper ends of the supporting-frames 14. It will be apparent, therefore, that the arrangement shown in Fig. 5 for securing the adjustment of the upper ends of the supporting-frames 14 is duplicated at the lower ends of said frames. As clearly shown by Fig. 2, the frames 14, which are in the form of flat bars, are provided with longitudinal slots $16^a$, through which set-screws 17 extend from roller-frames 18, having upwardly-projecting angular ends 19, in which trunnions 20 of rollers 21 are movably mounted. The set-screws 17 are supplied with clamping-nuts 22, and through the medium of said screws and nuts the roller-frames 18 may be adjustable longitudinally on the supporting-frames 14 to project the lower ends of the rollers a greater distance downwardly into the pot or tank 1 or raise said ends in relation to said pot or tank in accordance with the quantity of solder contained therein and also proportionate to the dimensions of the vessel or device to be soldered. The supporting-frames 14 are also adjustable toward and away from each other through the medium of the slots 15' to correspondingly move the rollers 21 to accommodate vessels or devices having different diameters, and to permit the body of the vessel to closely fit between the rollers the upper edge of the pot or tank 1, to which the frames 14 are attached, and the bars 16 of the frame 5 are respectively formed with concaved depressions 23 and 24.
To a cross-bar 25, secured to the legs 2, on which the plate 4 is mounted, and at a suitable distance below said plate a treadle 26 is fulcrumed and has a lower horizontal member 27, provided with a pressure-plate 28.
The treadle 26 is suitably curved or bent to pass upwardly underneath the pot or tank 1 between a portion of the burners 9 and through a guide-slot 29, formed in an extension 30 at the upper portion of the side of the pot or tank opposite that on which the rollers 21 are arranged. The upper extremity of the treadle extends a suitable distance above the top of the pot or tank 1 and is formed with a longitudinal slot 32, in which a head 33 is adjustably mounted and provided with a transverse slot 34, in which a horizontal arm 35 is adjustably disposed and held in immovable relation to the head by a set-screw 36, extending into the latter, as clearly shown by Fig. 3.
The arm 35 is angular in cross-section, and the slot 34 is of similar formation, so as to prevent the arm from turning in the head. On the inner end of the arm 35 a wheel or disk 37 is horizontally disposed for loose rotative movement, and rising from the center of the disk, but independent of the latter, is a bearing-finger 38, the purpose of the arm 35, with its wheel, being to limit the depth that the vessel or device soldered slides downwardly into the melted solder in the pot or tank 1. The finger 38 is bent merely to hold the wheel or disk 37 in place without the necessity of employing a nut or similar device.

Adjacent to one end of the pot or tank 1 is a frame 39, comprising a series of legs 40, which are bolted to the support or flooring to which the legs 2 are attached, and to one set of legs the upper end of an inclined brace 41' is also secured. The legs 40 converge toward their upper ends and are secured in a rigid manner and provided with suitable bearings for a shaft 41, the bearings for the said shaft being adjustable by any of the well-known means, so that the vertical elevation of the shaft may be varied to compensate for other adjustments which will be hereinafter explained. The particular means for adjusting the shaft 41 is not essential, as such adjustment is an obvious expedient, and a large number of different devices might be employed for this purpose. On one end of the shaft 41 is a drive-pulley 42, which receives a belt 43 from a suitable power source. On the opposite extremity of the shaft 41 inside of the adjacent legs 40 is a flanged band wheel or pulley 44, and projecting over the tank 1 from the said shaft is a swinging arm 45, adjustably held by suitable braces 46 and 47, respectively, running to an upright bar 48 and to one of the legs 40, adjacent to the drive-pulley 42. The arm 45 is capable of being raised or lowered during the soldering operation, as hereinafter described, and in order to limit the downward movement of said arm the bar 48 is connected by a suitable pin with the longitudinal slot in the strap 49, which strap is twisted intermediate its end, and thus extends around to the opposite side of said bar 48, where it is attached in any suitable manner to the upper end of a rigid brace or bar 50, as shown in Fig. 4, said bar 50 being mounted on one of the legs 40 in any suitable manner. Holes 51 are formed in the arm 45 in order to permit the braces 46 and 47 to be adjustably connected therewith by fitting the bolts on said braces into different holes, so that the arm 45 will be capable of bearing upon different sizes or diameters of cans during the soldering operation hereinafter described. In the outer extremity of the arm 45 a stub-shaft 52 is mounted, and thereon is rotatably held a flanged band wheel or pulley 53, and surrounding the pulleys 44 and 53 is a suitable band or belt 54, which is adapted to be brought in contact with the vessel or device held between the rollers 21, with sufficient frictional pressure to rotate such vessel or device during the soldering operation, and thereby regularly bring different portions of the seams to be soldered into engagement with the solder in the pot or tank 1. The belt 54 is held taut not only to prevent slipping thereof on the pulleys 44 and 53, but to overcome any tendency of the said belt slipping due to the additional pressure imposed thereon when brought into contact with the vessel or device to be soldered and during the rotation of said vessel or device. To hold the belt taut, a grooved belt-tightening wheel or pulley 55 engages the lower portion thereof and is carried on the lower end of an arm 56, having a lower slot 57 and an upper slot 58 formed therein, the said slots being respectively engaged by clamping-bolts 59 and 60, extending from the arm 45 and the brace 46. The free end of the arm 45 has the lower end of a rope or cable 61 secured thereto, said rope or cable then being passed upwardly over a pair of guide-pulleys 62, held by hangers 63, depending from an upper support above the machine, and after passing over said guide-pulleys 62 the rope or cable then extends downwardly and is secured to one end of a treadle 64, hinged or otherwise movably attached to the floor or base-support for the legs 2 and 40. The treadle 64 is located adjacent the end of the pot or tank 1 opposite that at which the frame 39 is arranged, and the free end of said treadle 64 moves in an inverted-U-shaped guide 65, also secured to the floor or base-rest for the machine.

In Fig. 1 the vessel-rotating device comprising the arm 45, pulleys 44 and 53, and band 54, together with the operating parts therefor, is shown elevated; but the normal position of the belt 54 is close to the rollers 21, and in placing the vessel or device between the said rollers 21 the arm 45, together with the belt 54 and pulley 53, is elevated by depressing the treadle 64, and after the vessel or device to be soldered is properly arranged between the rollers 21 the rotating mechanism therefor, as set forth, is permitted to lower to bring the belt 54 into contact with said vessel or device by releasing the treadle 64, and thereby rotate the vessel or device so as to bring the seam thereof fully in contact with the solder contained within the pot or tank 1. Before the rotation of the vessel or device to be soldered is permitted to take place the arm 35 and wheel 37 are arranged to properly engage the said vessel or device to prevent the latter from being depressed too far into the pot or tank 1, the treadle 26 being permitted to remain in lowered position to cause the wheel 37 to engage the vessel or device. Just previous to the soldering operation the attendant or operator applies an acid or soldering flux to the seam with a small brush while the vessel or device is being revolved, and after the same has been fully engaged by the solder within the tank the vessel or device is thrown upwardly by depressing the treadle 26, and the surplus solder is removed from the seam by the use of a wire brush, which is pressed against the vessel or device while the same is revolved by the belt 54. It will also be understood that in the preliminary operation of applying the acid or soldering flux to the seam of the vessel or device to be soldered the treadle 26 will also be depressed to cause the wheel 37 and bearing-finger 38, carried by the arm 35, to hold the vessel or device elevated clear of the solder within the pot or tank 1, and after completion of the preliminary steps the treadle 26 is released, and the vessel or device is permitted to slide downwardly between the rollers into contact with the solder in the pot or tank. After the vessel or device has been fully treated the revolving mechanism therefor, including the belt 54, is elevated by depressing the treadle 64, when the completed vessel or device may be easily removed and another placed between the rollers 21. It will be seen that the rollers 21 avoid injury to the vessel or device during the soldering operation by providing an antifrictional support therefor.

The improved soldering-machine will be found exceptionally useful and convenient in view of the capability of the same to operate in connection with vessels or devices having different dimensions, and though the preferred form of the invention has been illustrated and described it will be understood that changes in the proportions, dimensions, and minor details may be resorted to without departing from the principle of the invention.

Having thus fully described the invention, what is claimed as new is—

1. In a soldering-machine, the combination of a tank for holding melted solder, upwardly-inclined adjustable antifrictional devices disposed in operative relation to one edge of the same, and adapted to hold the device to be soldered therebetween, means for controlling the extent of the device to be soldered into the tank, and a swinging belt directly bearing upon and movable to and from the antifrictional devices for rotating the device to be soldered.

2. In a soldering-machine, the combination of a tank for holding melted solder, a pair of adjustable rollers extending upwardly at an angle of inclination from one edge of the said tank, the rollers being movable toward or away from each other and also into or upwardly from the tank, and a swinging belt mechanism adapted to engage the device to be soldered to rotate the same.

3. In a soldering-machine, the combination of a tank for receiving solder, a series of burners disposed under the tank, a pair of rollers disposed at an upward angle of inclination in relation to one edge of the tank and adjustable to shift them longitudinally or toward or away from each other, a swinging revolving mechanism including a belt disposed over the rollers, and means connected to said swinging revolving device for raising the same.

4. In a soldering-machine, the combination of a tank to hold the melted solder, adjustable antifrictional devices extending upwardly at an angle of inclination in relation to the one edge of the tank, a swinging revolving mechanism including a belt movable toward and upwardly away from the said antifrictional devices, and a movable and vertically-adjustable limiting element to engage the device soldered to control the depression of the same into the tank.

5. In a soldering-machine, the combination of a tank for holding melted solder, antifrictional retaining devices adjustably mounted in relation to one edge of the same and between which the device to be soldered is disposed, a swinging revolving mechanism including a belt vertically movable downwardly toward and upwardly from the said antifrictional devices, a foot-treadle connected to the said revolving mechanism, and another treadle having a limiting element adjustably held thereby for controlling the depression of the device being soldered into the tank.

6. In a soldering-machine, the combination of a tank for holding solder, a fixed frame projecting outwardly therefrom at an angle of inclination, antifrictional rollers depressed at an upward angle of inclination and engaging the one edge of the tank and the top of the said frame, said rollers being movable toward and upwardly from each other, revolving mechanism including a belt movable toward and away from the said antifrictional rollers, means for elevating the said revolving mechanism, a treadle having an adjustable stop device, and an arm movably secured thereto and provided with a rotatable element to engage the device to be soldered to limit the depression thereof into the tank, and means for actuating the revolving mechanism.

In testimony whereof I affix my signature in presence of two witnesses.

THEODORE BUMANN.

Witnesses:
GILBERT J. FRICK,
T. F. BLANKLEY.